United States Patent
Usui

(10) Patent No.: US 10,990,052 B2
(45) Date of Patent: Apr. 27, 2021

(54) IMAGE FORMATION APPARATUS, NON-TRANSITORY COMPUTER-READABLE RECORDING MEDIUM, AND CONTROL METHOD FOR ACQUIRING CHARACTERISTICS OF RECORDING MEDIUM

(71) Applicant: SHARP KABUSHIKI KAISHA, Osaka (JP)

(72) Inventor: Takashi Usui, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/703,098

(22) Filed: Dec. 4, 2019

(65) Prior Publication Data

US 2020/0192262 A1 Jun. 18, 2020

(30) Foreign Application Priority Data

Dec. 12, 2018 (JP) .............................. JP2018-232306

(51) Int. Cl.
   *G03G 15/00* (2006.01)
   *G03G 15/20* (2006.01)
   *G06T 7/00* (2017.01)

(52) U.S. Cl.
   CPC ..... *G03G 15/5062* (2013.01); *G03G 15/2039* (2013.01); *G03G 15/5029* (2013.01); *G06T 7/0004* (2013.01); *G03G 2215/00616* (2013.01); *G03G 2215/00751* (2013.01); *G06T 2207/30144* (2013.01)

(58) Field of Classification Search
   CPC .................................................. G03G 15/5029
   See application file for complete search history.

(56) References Cited

U.S. PATENT DOCUMENTS

| 2007/0040884 A1* | 2/2007 | Shoki .................. B41J 11/0095 |
| | | 347/101 |
| 2007/0091384 A1* | 4/2007 | Lin ........................ B41J 11/009 |
| | | 358/474 |
| 2007/0092328 A1* | 4/2007 | Lin ........................ B41J 11/009 |
| | | 400/679 |

(Continued)

FOREIGN PATENT DOCUMENTS

JP 2006-175611 A 7/2006

*Primary Examiner* — Walter L Lindsay, Jr.
*Assistant Examiner* — Milton Gonzalez
(74) *Attorney, Agent, or Firm* — ScienBiziP, P.C.

(57) ABSTRACT

An image formation apparatus includes an image former and a detection sensor. The image former forms an image on paper delivered in a first paper delivery path. The detection sensor includes an irradiator and an acquirer. The irradiator and the acquirer are arranged at positions facing each other through the first paper delivery path. The irradiator irradiates the paper with a predetermined pattern image while the paper is passing through the detection sensor. The acquirer acquires a calculation image including a transmission image formed after the predetermined pattern image has been transmitted through the paper. In the image formation apparatus, the degree of image expansion is calculated from a predetermined area including the transmission image in the calculation image, and printing conditions are adjusted according to the degree of image expansion.

13 Claims, 14 Drawing Sheets

(56) References Cited

U.S. PATENT DOCUMENTS

| | | | | |
|---|---|---|---|---|
| 2008/0252909 | A1* | 10/2008 | Honguh | G01N 21/57 358/1.1 |
| 2008/0253782 | A1* | 10/2008 | Honguh | G03G 15/5029 399/45 |
| 2008/0310863 | A1* | 12/2008 | Honguh | G03G 15/5029 399/16 |
| 2010/0309488 | A1* | 12/2010 | Koyama | G03G 15/5029 369/103 |

* cited by examiner

|  | 63gsm | 80gsm | 120gsm | 200gsm |
|---|---|---|---|---|
| MAXIMUM VALUE | 255 | 254 | 255 | 255 |
| MINIMUM VALUE | 0 | 0 | 0 | 0 |
| AVERAGE VALUE | 165.63 | 162.30 | 152.72 | 107.38 |
| STANDARD DEVIATION | 79.68 | 79.05 | 77.55 | 68.30 |
| VARIANCE | 6348.30 | 6248.65 | 6013.36 | 4664.17 |

IMAGE FORMATION APPARATUS, NON-TRANSITORY COMPUTER-READABLE RECORDING MEDIUM, AND CONTROL METHOD FOR ACQUIRING CHARACTERISTICS OF RECORDING MEDIUM

BACKGROUND OF THE INVENTION

Field of the Invention

The present invention relates to an image formation apparatus, a non-transitory computer-readable recording medium, and a control method. Specifically, the present invention relates, for example, to an image formation apparatus, a non-transitory computer-readable recording medium, and a control method for acquiring the characteristics of a recording medium according to the output of an optical sensor.

Description of the Background Art

Japanese Unexamined Patent Application Publication No. 2006-175611 discloses one example of an image formation apparatus of a background art. The image formation apparatus of the background art irradiates paper with light, captures an image of light reflected on the paper and an image of light transmitted through the paper, discriminates the type of paper according to analysis results of a reflected light amount and a transmitted light amount, and sets image formation conditions according to the discriminated type of paper.

However, in the image formation apparatus of the background art, the reflected light amount and the transmitted light amount change in, e.g., coated paper, single-side-coated paper, and colored paper and it is difficult to accurately discriminate the type of paper.

For this reason, a main object of the present invention is to provide a new image formation apparatus, a non-transitory computer-readable recording medium, and a control method.

Another object of the present invention is to provide an image formation apparatus, a non-transitory computer-readable recording medium, and a control method for properly discriminating the type of recording member and properly adjusting printing conditions.

SUMMARY OF THE INVENTION

A first aspect of the invention is an image formation apparatus including an image former, a light irradiator, an acquirer, a calculator, and an adjustor. The image former forms an image on a recording medium delivered in a predetermined delivery path. The light irradiator irradiates the recording medium delivered in the predetermined delivery path with a predetermined pattern image. The acquirer is provided at a position facing the light irradiator through the predetermined delivery path, and acquires a calculation image including a transmission image formed after the predetermined pattern image has been transmitted through the recording medium. Based on the calculation image, a characteristic value of the recording medium as the amount of expansion or blurring of the transmission image for the predetermined pattern image is calculated. The adjustor adjusts an image formation condition in the image former according to the characteristic value calculated by the calculator.

A second aspect of the invention is the image formation apparatus dependent on the first aspect of the invention, in which the image former includes a transferor that transfers a toner image to the recording medium, and a fixer that heats and fixes the toner image on the recording medium, wherein the adjustor adjusts the amount of heat received by the recording medium at the fixer.

A third aspect of the invention is the image formation apparatus dependent on the second aspect of the invention, in which the adjustor adjusts a fixing temperature at the fixer according to the characteristic value.

A fourth aspect of the invention is the image formation apparatus dependent on the second aspect of the invention, in which the adjustor adjusts, according to the characteristic value, the delivery speed of the recording medium while the recording medium is passing through the fixer. A fifth aspect of the invention is the image formation apparatus dependent on the third aspect of the invention, in which the adjustor adjusts, according to the characteristic value, the delivery speed of the recording medium while the recording medium is passing through the fixer.

A sixth aspect of the invention is the image formation apparatus dependent on the first aspect of the invention, in which the predetermined pattern image is a dot-shaped image.

A seventh aspect of the invention is the image formation apparatus dependent on the first aspect of the invention, in which the predetermined pattern image is a linear image.

An eighth aspect of the invention is the image formation apparatus dependent on the first aspect of the invention, in which the predetermined pattern image is an image in a predetermined shape having a linear boundary.

A ninth aspect of the invention is the image formation apparatus dependent on the first aspect of the invention, which further includes a cylindrical lens provided closer to a light irradiator side than the predetermined delivery path is to between the light irradiator and the acquirer and arranged inclined at a predetermined angle with respect to the recording medium delivered in the predetermined delivery path.

A tenth aspect of the invention is the image formation apparatus dependent on the first aspect of the invention, in which the calculation image includes one or more still images.

An eleventh aspect of the invention is the image formation apparatus dependent on the tenth aspect of the invention, in which the calculation image includes multiple still images and the calculator calculates the characteristic value based on an image obtained by averaging of the multiple still images.

A twelfth aspect of the invention is a non-transitory computer-readable recording medium storing a control program in an image formation apparatus including an image former that forms an image on a recording medium delivered in a predetermined delivery path, wherein the control program causes a processor of the image formation apparatus to execute light irradiating of irradiating the recording medium delivered in the predetermined delivery path with a predetermined pattern image, acquiring a calculation image including a transmission image formed after the predetermined pattern image has been transmitted through the recording medium, calculating, based on the calculation image, a characteristic value of the recording medium as the amount of expansion or blurring of the transmission image for the predetermined pattern image, and adjusting an image formation condition in the image former according to the characteristic value.

A thirteenth aspect of the invention is a method for controlling an image formation apparatus including an image former that forms an image on a recording medium delivered in a predetermined delivery path, which includes (a) irradiating the recording medium delivered in the predetermined delivery path with a predetermined pattern image, (b) acquiring a calculation image including a transmission image formed after the predetermined pattern image has been transmitted through the recording medium, (c) calculating, based on the calculation image, a characteristic value of the recording medium as the amount of expansion or blurring of the transmission image for the predetermined pattern image, and (d) adjusting an image formation condition in the image former according to the characteristic value.

According to the present invention, characteristics of a recording member can be properly discriminated, and printing conditions can be properly adjusted.

The above-described objects of the present invention and other objects, features, and advantages of the present invention will be more apparent from the following detailed description of embodiments with reference to drawings.

DESCRIPTION OF THE PREFERRED EMBODIMENTS

First Embodiment

Figure 1:
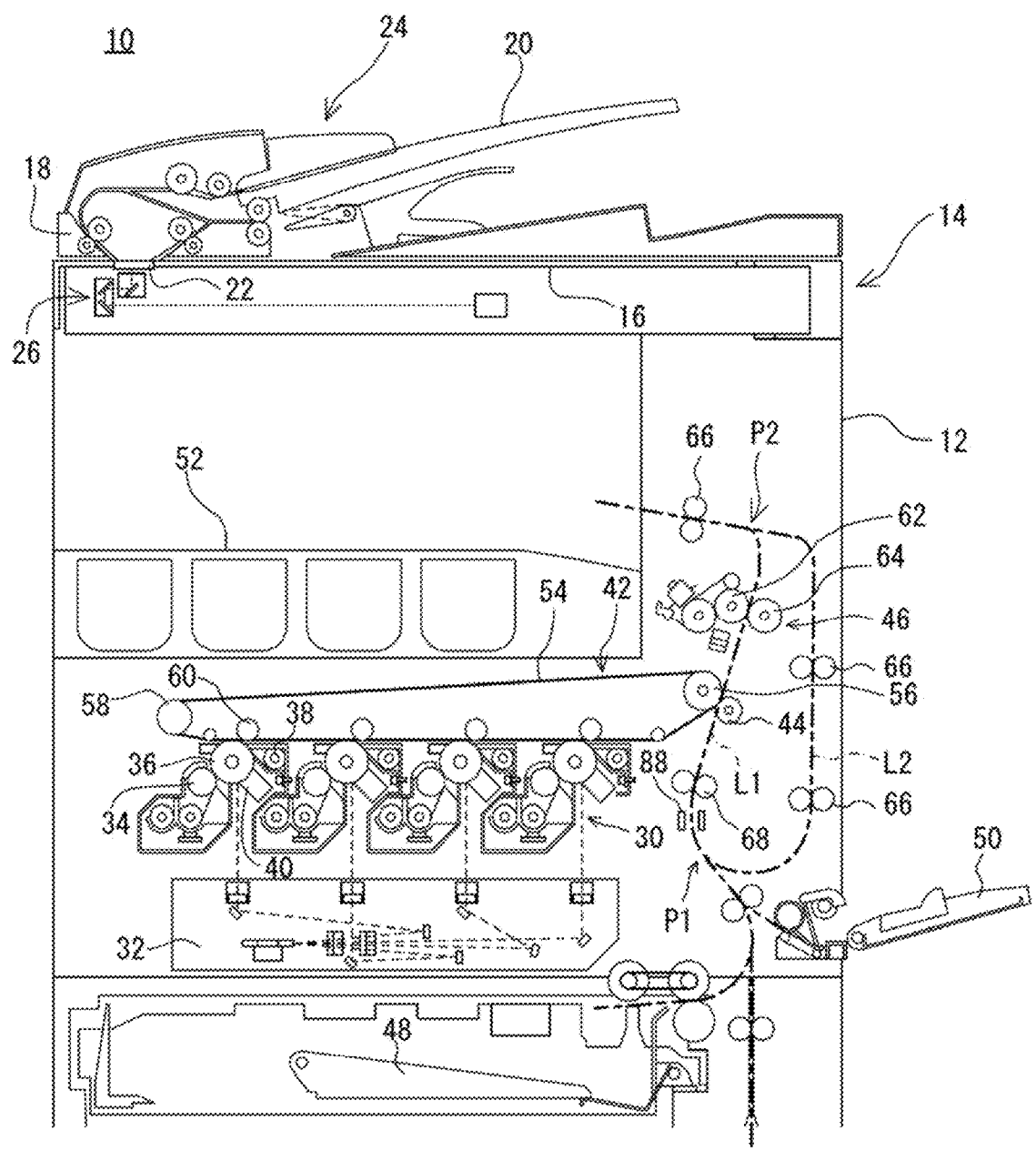
FIG. 1 is a view for describing an outline configuration in a case where an image formation apparatus as a first embodiment of the present invention is viewed from the front.

Referring to FIG. 1, an image formation apparatus 10 as one embodiment of the present invention is an electrophotographic image formation apparatus having a double-sided printing function, the image formation apparatus forming (printing) a multi-color image (a color image) or a single-color image on front and back surfaces of paper (a recording medium) through processes of charging, exposure, development, transfer, and heat fixing.

In the first embodiment, the image formation apparatus 10 is a multifunction machine (multifunction peripheral: MFP) having a copying function, a printer function, a scanner function, a facsimile function, etc. Note that the image formation apparatus 10 is not necessarily limited to the multifunction machine, and may be any of a copying machine, a printer, and a facsimile.

First, a basic configuration of the image formation apparatus 10 will be roughly described. As illustrated in FIG. 1, the image formation apparatus 10 includes an apparatus body 12 having an image former 30 etc., and an image reading apparatus 14 arranged above the apparatus body 12.

The image reading apparatus 14 includes a document mounting table 16 made of a transparent material. A document holding cover 18 is openably attached to above the document mounting table 16 through, e.g., a hinge. At the document holding cover 18, an automatic document feeding apparatus (auto document feeder: ADF) 24 that automatically feed, one by one, a document mounted in a document mounting tray 20 to an image reading position 22 is provided. Moreover, on a front side of the document mounting table 16, an operator (not shown) including, e.g., a touch panel and an operation button for receiving user's input operation such as a printing start instruction is provided.

Moreover, an image reader 26 including a light source, multiple mirrors, an imaging lens, a line sensor, etc. is built in the image reading apparatus 14. The image reader 26 exposes a document surface with light by the light source, and guides reflected light from the document surface to the imaging lens by the multiple mirrors. Then, the image reader 26 forms, by the imaging lens, an image of the reflected light on a light receiving element of the line sensor. In the line sensor, the luminance and chromaticity of the reflected light whose image was formed on the light receiving element are detected, and image data based on an image of the document surface is generated. For example, a charge coupled device (CCD) or a contact image sensor (CIS) is used as the line sensor.

As illustrated in FIG. 1, the image former 30 includes, for example, an exposure apparatus 32, a developer 34, a photoconductive drum 36, a photoconductive cleaner unit 38, a charger 40, a transfer unit 42, and a fixing unit 46. The image former 30 forms an image on paper delivered from a paper feeding tray 48 or a manual paper feeding tray 50, and after image formation, discharges the paper to a paper discharge tray 52. For example, the image data read by the image reader 26 or image data transmitted from an external computer is utilized as image data for forming an image on paper.

Figure 2:
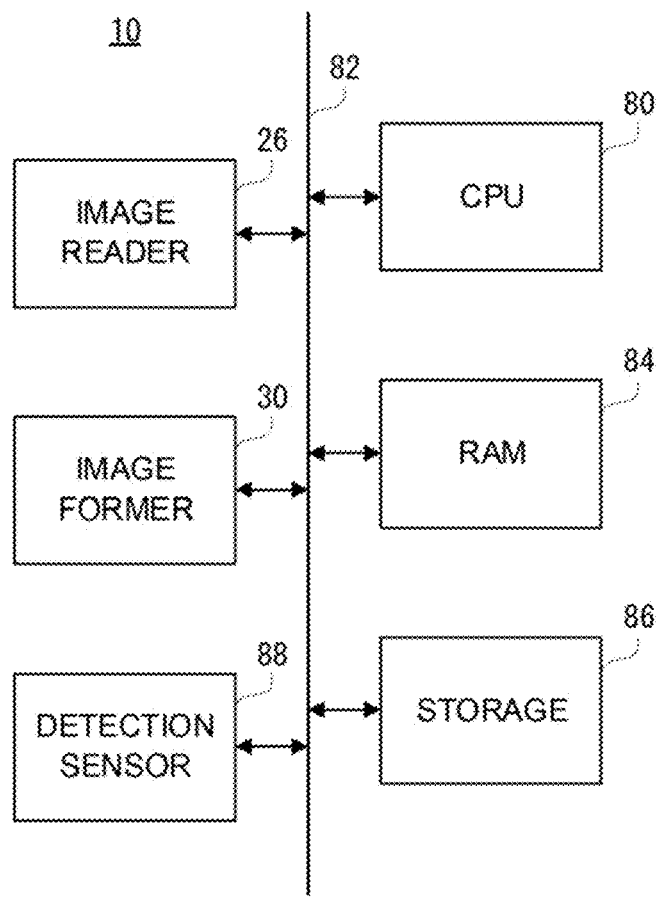
FIG. 2 is a block diagram of an electric configuration of the image formation apparatus of FIG. 1.

Note that the image data taken by the image formation apparatus 10 corresponds to color images in four colors of black (K), cyan (C), magenta (M), and yellow (Y). Thus, four developers 34, four photoconductive drums 36, four photoconductive cleaner units 38, and four chargers 40 are provided to separately form four types of toner images corresponding to each color, and form four image stations. As illustrated in FIG. 2, four image stations are independently provided, and in the first embodiment, an image station for yellow (Y), an image station for magenta (M), an image station for cyan (C), and an image station for black (K) are provided in this order from an upstream side in a revolving direction of an intermediate transfer belt 54.

The photoconductive drum 36 is an image carrier that a photosensitive layer is formed on a surface of a cylindrical base having conductivity, and the charger 40 is a member that charges a surface of the photoconductive drum 36 with a predetermined potential. Moreover, the exposure apparatus 32 is configured as a laser scanning unit including a laser diode (LD), a polygon mirror, etc., and is arranged below the photoconductive drum 36. The exposure apparatus 32 exposes the charged surface of the photoconductive drum 36 with light, thereby forming an electrostatic latent image corresponding to the image data on the surface of the photoconductive drum 36. The developer 34 visualizes, with toner in four colors (YMCK), the electrostatic latent image formed on the photoconductive drum 36. Moreover, the photoconductive cleaner unit 38 removes the toner remaining on the surface of the photoconductive drum 36 after development and image transfer.

The transfer unit 42 includes, for example, the intermediate transfer belt 54, a drive roller 56, a driven roller 58, four intermediate transfer rollers 60, and a secondary transfer roller 44. The transfer unit 42 is arranged above the photoconductive drum 36 of each image station.

The intermediate transfer belt 54 is an endless belt having flexibility, and is made of, e.g., synthetic resin or rubber mixed with a conductive material such as carbon black as necessary. The intermediate transfer belt 54 is suspended by the drive roller 56 and the driven roller 58, and is arranged such that an outer peripheral surface thereof contacts an outer peripheral surface of each photoconductive drum 36. Moreover, the intermediate transfer belt 54 revolves in a predetermined direction (counterclockwise in FIG. 1) in association with rotary drive of the drive roller 56.

The drive roller 56 is provided rotatably about the axis of the drive roller 56 by a not-shown driver. The driven roller 58 rotates in association with revolving of the intermediate transfer belt 54, and provides constant tension to the intermediate transfer belt 54 to prevent the intermediate transfer belt 54 from slackening.

The intermediate transfer roller 60 is arranged at a position facing each photoconductive drum 36 with the intermediate transfer belt 54 being interposed therebetween. Upon image formation, a predetermined voltage (a primary transfer voltage) is applied to the intermediate transfer roller 60, and accordingly, a transfer electric field is formed between the photoconductive drum 36 and the intermediate transfer belt 54. By action of such a transfer electric field, the toner image formed on the outer peripheral surface of the photoconductive drum 36 of each image station is transferred to the outer peripheral surface of the intermediate transfer belt 54.

The secondary transfer roller 44 is provided to press the intermediate transfer belt 54 between the secondary transfer roller 44 and the drive roller 56. Upon image formation, a predetermined voltage (a secondary transfer voltage) is applied to the secondary transfer roller 44, and accordingly, a transfer electric field is formed between the intermediate transfer belt 54 and the secondary transfer roller 44. By action of such a transfer electric field, the toner image formed on the outer peripheral surface of the intermediate transfer belt 54 is transferred (secondary transferred) to the paper while the paper is passing through a transfer nip area between the intermediate transfer belt 54 and the secondary transfer roller 44.

The fixing unit 46 includes a heat roller 62 and a pressure roller 64, and is arranged above the secondary transfer roller 44. The heat roller 62 is set to a predetermined fixing temperature. While the paper is passing through a nip area between the heat roller 62 and the pressure roller 64, the toner image transferred to the paper is heated and pressure-contacted, and accordingly, the toner image is heat-fixed to the paper.

In the apparatus body 12 described above, a first paper delivery path L1 for sending the paper from the paper feeding tray 48 or the manual paper feeding tray 50 to the paper discharge tray 52 through a resist roller 68, the secondary transfer roller 44, and the fixing unit 46 is formed. Moreover, a second paper delivery path L2 for returning, when double-sided printing is performed for the paper, the paper having passed through the fixing unit 46 after the end of printing for the front side to the first paper delivery path L1 on an upstream side of the secondary transfer roller 44 in a paper delivery direction is formed. In the first paper delivery path L1 and the second paper delivery path L2, multiple delivery rollers 66 for providing auxiliary propulsion force to the paper are provided as necessary.

The resist roller 68 is also called a paper stop roller (a PS roller), and delivers the paper at a speed equal to a process speed for performing image formation on the paper by the image former 30. For example, the resist roller 68 stands by (temporarily stops) in a state in which the resist roller 68 sandwiches the paper delivered by the delivery rollers 66, and starts paper delivery in synchronization with the transfer unit 42. At this point, the resist roller 68 rotates at a circumferential speed equal to the circumferential speed of the intermediate transfer belt 54.

When one-sided printing is performed in the image formation apparatus 10, the paper is, one by one, guided to the first paper delivery path L1 from the paper feeding tray 48 or the manual paper feeding tray 50, and is delivered to the resist roller 68 by the delivery rollers 66. Then, by the resist roller 68, the paper is delivered to the secondary transfer roller 44 (a secondary transfer nip) at such timing that a tip end of the paper and a tip end on the intermediate transfer belt 54 as indicated by image information match each other, and the toner image is transferred onto the paper. Thereafter, unfixed toner on the paper is heat-fixed by passage through the fixing unit 46 (a fixing nip), and the paper is discharged onto the paper discharge tray 52.

On the other hand, upon double-sided printing, when a back end portion of the paper having passed through the fixing unit 46 after the end of printing for the front side reaches the delivery roller 66 in the vicinity of the paper discharge tray 52, the delivery roller 66 is rotated backward, and accordingly, the paper is delivered backward and guided to the second paper delivery path L2. The paper guided to the second paper delivery path L2 is delivered in the second paper delivery path L2 by the delivery roller 66, and is guided to the first paper delivery path L1 on an upstream side of the resist roller 68 in the paper delivery direction. At this point, the front and back of the paper are reversed, and thereafter, printing for the back side of the paper is performed while the paper is passing through the secondary transfer roller 44 and the fixing unit 46 by way of the resist roller 68.

FIG. 2 is a block diagram of one example of an electric configuration of the image formation apparatus 10 illustrated in FIG. 1. As illustrated in FIG. 2, the image formation apparatus 10 includes a CPU 80, and a RAM 84, a storage 86, the image reader 26, the image former 30, a detection sensor 88, etc. are connected to the CPU 80 through a bus 82. Moreover, although not shown in the figure, each component such as the operator is also connected to the CPU 80 through the bus 82.

The CPU 80 performs overall control of the image formation apparatus 10, and controls operation of each component of the above-described image formation apparatus 10 in an integrated manner. The RAM 84 is used as a work area and a buffer area of the CPU 80. The storage 86 is, for example, an HDD, and is a main storage apparatus of the image formation apparatus 10 that stores, e.g., a control program for controlling operation of each component of the image formation apparatus 10 by the CPU 80 and later-described adjustment value data 304d. Note that instead of or in addition to the HDD, other non-volatile memories such as an SSD, a flash memory, and an EEPROM may be used.

The detection sensor 88 is a sensor arranged in the first paper delivery path L1 and provided for detecting a characteristic value indicating characteristics of the paper (the recording medium). The detection sensor 88 is at least arranged between a joint point P1 of the first paper delivery path L1 and the second paper delivery path L2 and a branching point P2 of the first paper delivery path L1 and the second paper delivery path L2 (see FIG. 1). Note that the detection sensor 88 is preferably arranged on an upstream side of the fixing unit 46 (the fixing nip) in the paper delivery direction. Moreover, the detection sensor 88 is more preferably arranged on the upstream side of the secondary transfer roller 44 (the secondary transfer nip) in the paper delivery direction. In the first embodiment, the detection sensor 88 is arranged between the joint point P1 of the first paper delivery path L1 and the second paper delivery path L2 and the resist roller 68.

Figure 3:
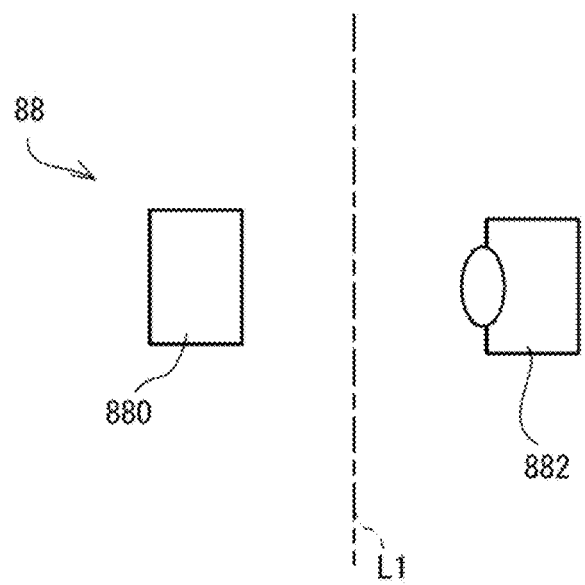
FIG. 3 is a view for describing an outline configuration of a detection sensor.

As illustrated in FIG. 3, the detection sensor 88 includes an irradiator 880 and an acquirer 882. As illustrated in FIG. 3, the irradiator 880 and the acquirer 882 are arranged to face each other through the first paper delivery path L1.

The irradiator 880 includes a light emitting element such as a light emitting diode, and while the paper is passing through the detection sensor 88, irradiates (projects) the paper delivered in the first paper delivery path L1 with a predetermined pattern image.

The acquirer 882 includes a light receiving element, and captures (acquires) a calculation image including an image (a transmission image) formed in such a manner that the pattern image irradiated from the irradiator 880 is transmitted through the paper. In the first embodiment, the acquirer 882 is an image capturing sensor including light receiving elements arranged in a matrix (in a two-axis direction), and generates the image data based on the two-dimensional calculation image. Moreover, the acquirer 882 is driven when the paper passes through the detection sensor 88, i.e., when the irradiator 880 irradiates the paper with the pattern image, and acquires the calculation image including the transmission image. Note that in the first embodiment, the calculation image is a single still image.

In the first embodiment, the irradiator 880 irradiates the paper with a dot-shaped pattern image. For example, the paper is irradiated with a dot-shaped high-luminance image (hereinafter sometimes referred to as a "bright point") surrounded by a low-luminance area. Note that the paper may be irradiated with a dot-shaped low-luminance image (hereinafter sometimes referred to as a "black point") surrounded by a high-luminance area.

When the pattern image is the bright point, the transmission image is the dot-shaped high-luminance image surrounded by the low-luminance area. On the other hand, when the pattern image is the black point, the transmission image is the dot-shaped low-luminance image surrounded by the high-luminance area. That is, when the paper is irradiated with the dot-shaped pattern image, the dot-shaped transmission image corresponding to such a pattern image is formed on an acquirer-882-side surface of the paper.

Figure 4A:
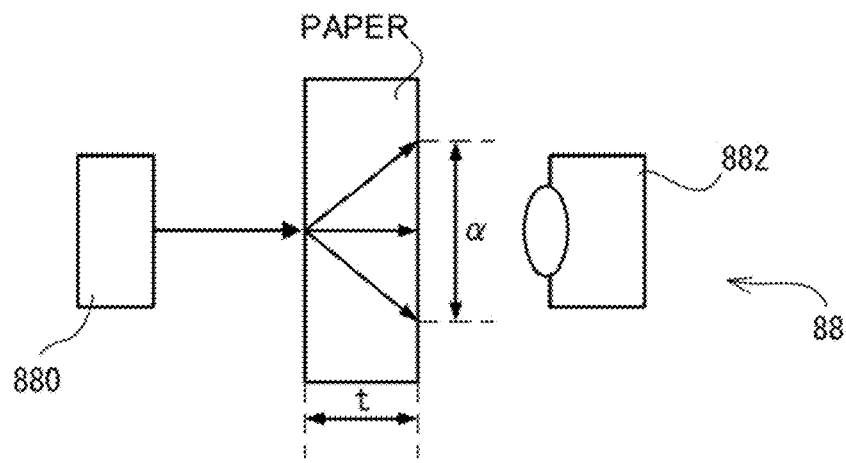
FIG. 4A is a view for describing image expansion in paper having a certain thickness upon light transmission.
Figure 4B:
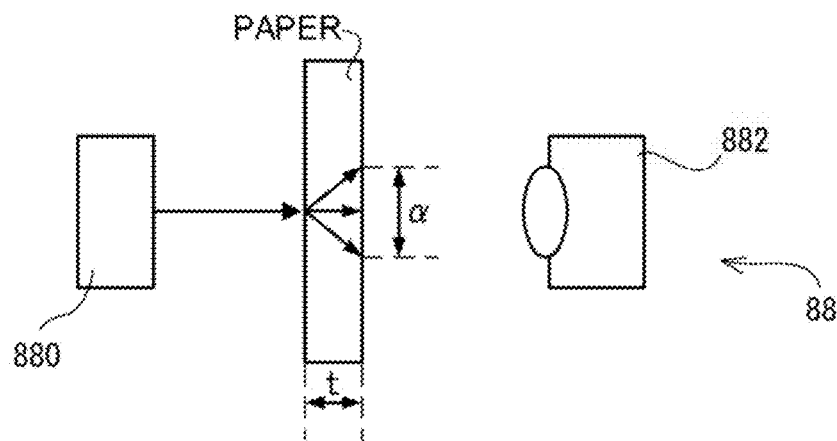
FIG. 4B is a view for describing image expansion in paper having other thickness upon light transmission.

Note that the electric configuration of the image formation apparatus 10 illustrated in FIG. 2 is merely one example, and the present invention is not necessarily limited to such a configuration. Although not shown in the figure, e.g., a position detection sensor that detects the position of the paper delivered in the first paper delivery path L1 and the second paper delivery path L2 is also provided at the image formation apparatus 10. The CPU 80 detects the position of the paper delivered in the first paper delivery path L1 and the second paper delivery path L2 according to the output of the position detection sensor. FIG. 4A is a view for describing expansion in paper having a certain thickness upon light transmission. FIG. 4B is a view for describing expansion in paper having other thickness upon light transmission. As illustrated in FIGS. 4A and 4B, light with which the paper is irradiated expands after having repeated internal scattering. Thus, the transmission image formed on the acquirer-882-side surface of the paper is an image that the pattern image irradiated on an irradiator-880-side surface of the paper expands. That is, the sharpness of the pattern image with which the paper is irradiated is degraded upon transmission through the paper. Moreover, the degree a of light expansion (the degree of image expansion) increases as the thickness t (or the basis weight) of the paper increases. That is, the degree of image expansion fluctuates according to the basis weight as one characteristic of the paper, and therefore, can be considered as the characteristic value of the paper.

As described above, there is a correlation between the degree of expansion of the image on the paper as the degree obtained from the calculation image acquired by the acquirer 882, i.e., the characteristic value of the paper, and the basis weight of the paper. According to the characteristic value of the paper, the basis weight as one characteristic of the paper is estimated. For example, when the degree of image expansion is great, it is estimated that the paper has a great basis weight. When the degree of image expansion is small, it is estimated that the paper has a small basis weight.

Specifically, the characteristic value of the paper calculated from the calculation image is the amount of expansion or blurring of the transmission image formed on the acquirer-882-side surface of the paper or the basis weight of the paper corresponding to such an amount. Hereinafter, an example of the method for calculating the characteristic value of the paper will be described.

Method for Setting Target Area in Calculation Image

Figure 5:
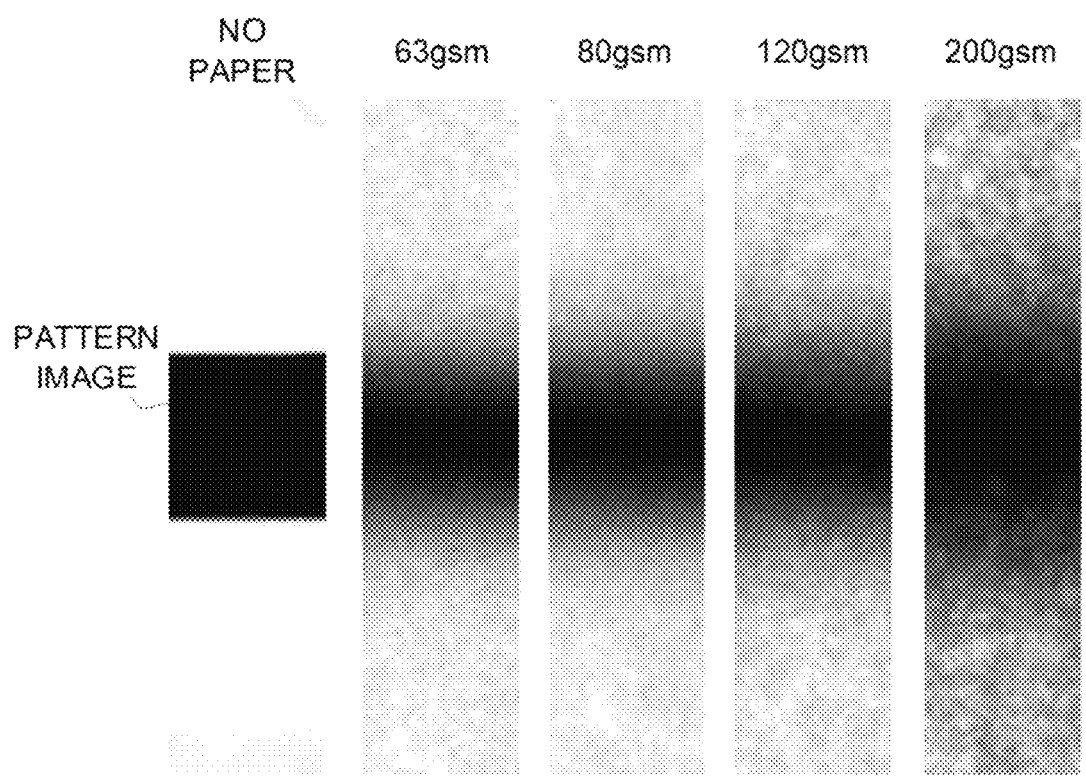
FIG. 5 is one example of a calculation image for different basis weights of paper.

First, as illustrated in FIG. 5, the calculation image for each of multiple types of basis weights of the paper is acquired. An example illustrated in FIG. 5 is a calculation image for each of four types of basis weights of the paper, i.e., 63 gsm (g/m$^2$: grams per square meter), 80 gsm, 120 gsm, and 200 gsm. Moreover, in the example illustrated in FIG. 5, the black point is used as the pattern image. Note that in this embodiment, the black point is an image formed by cutting of part of a linear low-luminance image (a black line) surrounded by a high-luminance area. Note that for reference, an image in the case of no paper, i.e., the case of, e.g., no image expansion, is also illustrated. Hereinafter, an edge position (a boundary position between an image area where the pattern image is present and a non-image area where no pattern image is present) of the pattern image in the image in the case of no paper will be sometimes referred to as a "theoretical edge position."

Figure 6:
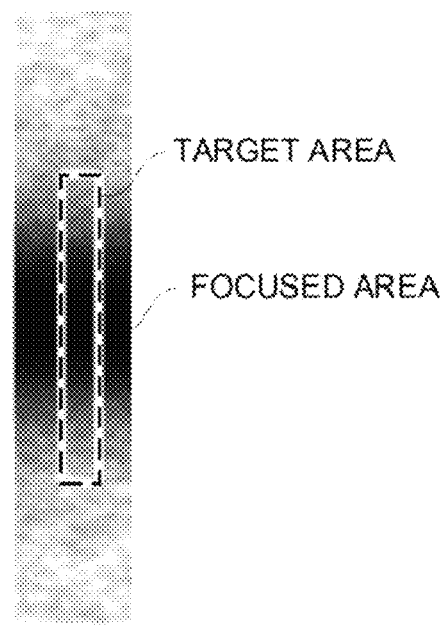
FIG. 6 is one example of a focused area and a target area in a certain calculation image.

Next, as illustrated in FIG. 6, a luminance area (a focused area) corresponding to the pattern image is extracted from each calculation image. Specifically, when the pattern image is the bright point, the high-luminance area of the calculation image is extracted as the focused area. When the pattern image is the black point, the low-luminance area of the calculation image is extracted as the focused area. At this point, the transmission image is formed as the image corresponding to the pattern image. Thus, the transmission image includes the high-luminance area when the pattern image is the bright point, and includes the low-luminance area when the pattern image is the black point. Thus, the focused area is an area included in the transmission image.

Next, a linear area (a target area) is set to include the extracted focused area. Note that the target area is set to extend across at least one edge of the focused area, i.e., to include one theoretical edge position. Note that the target area is preferably set to extend across edges of the focused area, i.e., to include both theoretical edge positions.

When the width (the length in a lateral direction) of the target area corresponds to only one pixel, the luminance (the pixel value) of each pixel fluctuates due to influence of paper quality (e.g., the crude density of fibers forming the paper), and an error becomes greater. For this reason, the width of the target area preferably corresponds to at least two pixels or more.

Figure 7:
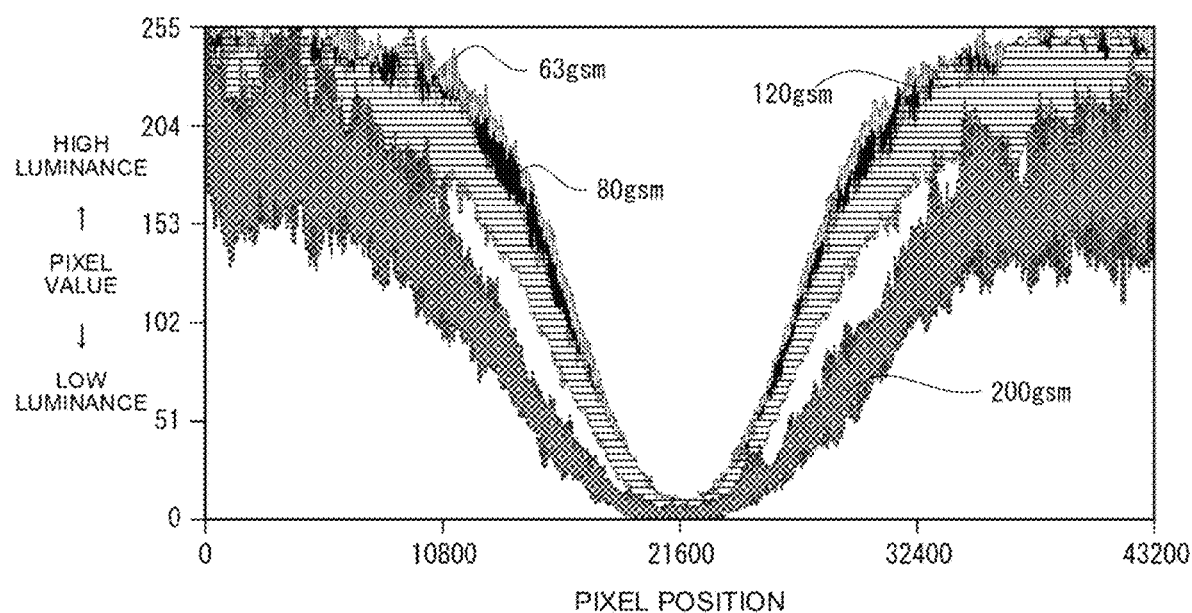
FIG. 7 is one example of a graph of data on a pixel value of each pixel included in the target area set for each calculation image for the different basis weights of the paper illustrated in FIG. 5.

FIG. 7 is a graph of data on the pixel value of each pixel included in the target area set for each calculation image illustrated in FIG. 5. Note that the pixel value is a value indicating the luminance of the pixel, and in the present embodiment, is represented by 256 levels of numerical values. Moreover, in an example illustrated in FIG. 7, the number of pixels included in the target area is 43200, and the position of each pixel corresponds to the position of the target area in a longitudinal direction thereof. As described above, in the example illustrated in FIG. 5, the black point is used as the pattern image, and therefore, the vicinity of the center of the target area in the longitudinal direction thereof, i.e., an area corresponding to the focused area, is an area corresponding to the pattern image. Thus, such an area is the low-luminance area. On the other hand, the vicinity of an end portion of the target area in the longitudinal direction thereof is an area corresponding to other portions than the pattern image, and therefore, is the high-luminance area. When the data on the pixel values of all pixels included in the target area is obtained, the characteristic value of the paper is calculated by any of the following three methods.

First Calculation Method

Figure 8:
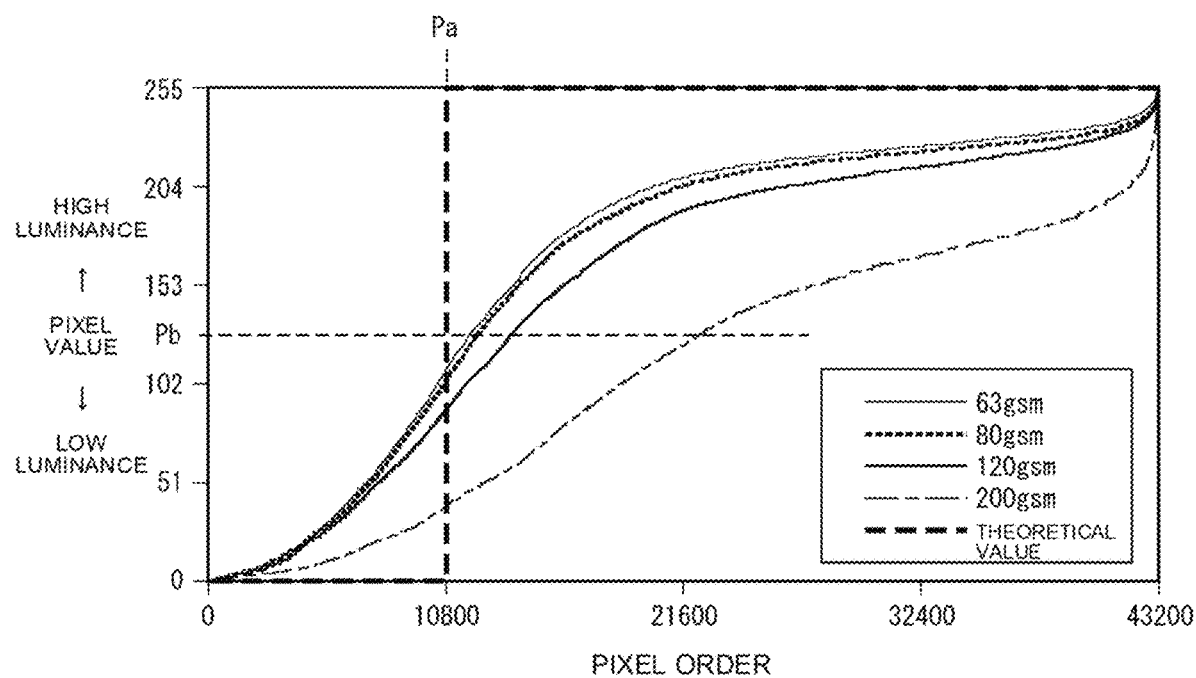
FIG. 8 is one example of a graph after the data on the pixel value of each pixel included in the target area has been sorted for the different basis weights of the paper illustrated in FIG. 7.

In a first calculation method, the basis weight of the paper corresponding to the amount of image expansion is calculated. In the first calculation method, the order (the pixel order) of pixel is, upon calculation of the amount of image expansion, set according to the magnitude of the pixel value regardless of the position of the pixel in the calculation image, and the data on the pixel value of each pixel included in the target area is sorted according to the pixel order, as illustrated in FIG. 8. A graph illustrated in FIG. 8 shows that the data on the pixel value of each pixel included in the target area is sorted in ascending order of the pixel value.

Figure 9:
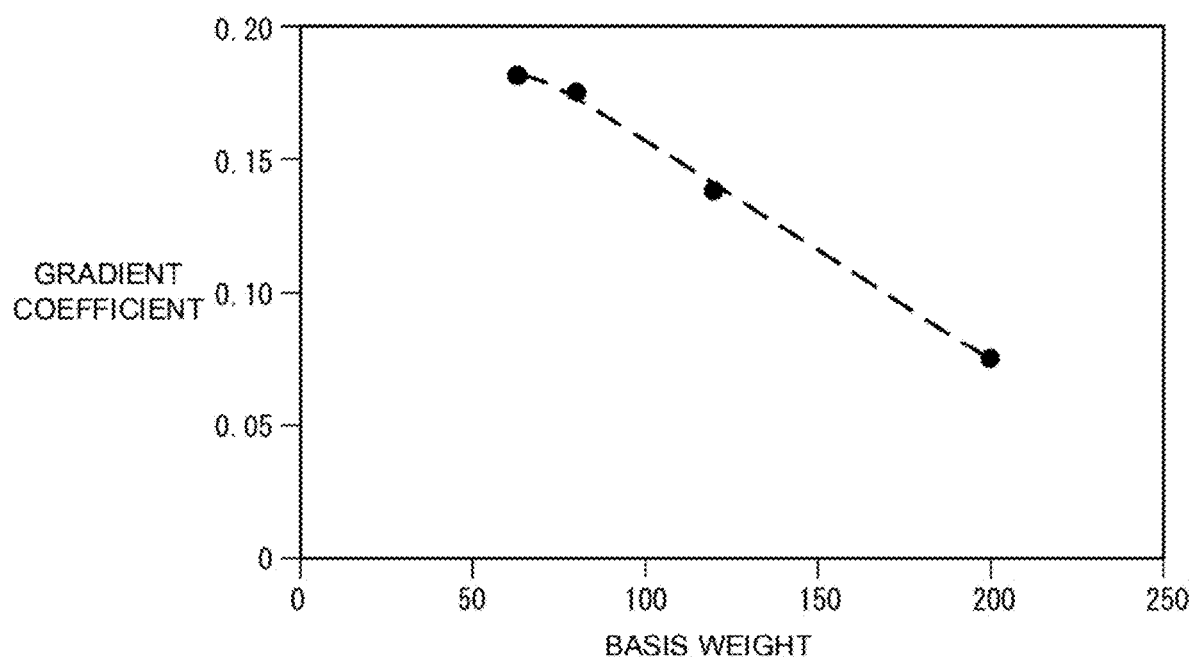
FIG. 9 is one example of a graph of a relationship between a gradient coefficient and the basis weight based on the data on the pixel value illustrated in FIG. 7.

Next, based on the change gradient (the gradient coefficient) of the pixel value at a pixel Pa (in an example illustrated in FIG. 8, a 10800th pixel in ascending order of the pixel value (the luminance)) at the order (the pixel order) corresponding to the theoretical edge position, a first calculation formula (a linear formula) for four types of basis weights of the paper based on a relationship between the gradient coefficient of the pixel Pa and the basis weight is derived as illustrated in FIG. 9. In a case where the amount of image expansion of certain paper is calculated after the first calculation formula has been derived, data on the pixel value of each pixel included in a target area of such paper is sorted in ascending order of the pixel value, the gradient coefficient of the pixel value of the pixel Pa at the order corresponding to the theoretical edge position is calculated, and the basis weight of the paper corresponding to the amount of image expansion is calculated according to the first calculation formula.

Second Calculation Method

Figure 10:
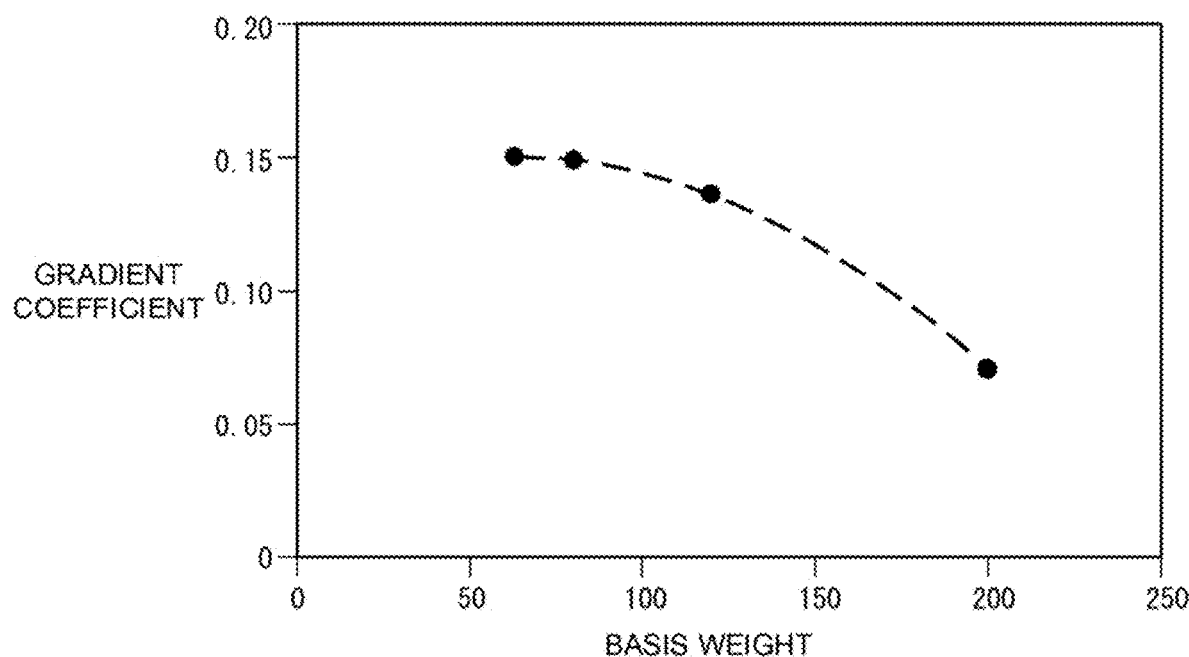
FIG. 10 is one example of a graph of the relationship between the gradient coefficient and the basis weight based on the data on the pixel value illustrated in FIG. 7.

In a second calculation method, the basis weight of the paper corresponding to the amount of image expansion is calculated as in the first calculation method. First, as in the first calculation method, the data on the pixel value of each pixel included in the target area is sorted according to the pixel order. Next, based on the gradient coefficient of the pixel value at a pixel Pb (in the example illustrated in FIG. 8, a pixel with an average pixel value of 128) at the order corresponding to the average pixel value, a second calculation formula (a quadratic formula) for four types of basis weights of the paper based on a relationship between the gradient coefficient of the pixel Pb and the basis weight is derived as illustrated in FIG. 10. In a case where the amount of image expansion of certain paper is calculated after the second calculation formula has been derived, data on the pixel value of each pixel included in a target area of such paper is sorted in ascending order of the pixel value, the gradient coefficient of the pixel value of the pixel Pb at the order corresponding to the average pixel value is calculated, and the basis weight of the paper corresponding to the amount of image expansion is calculated according to the second calculation formula.

Third Calculation Method

Figures 11, 12:
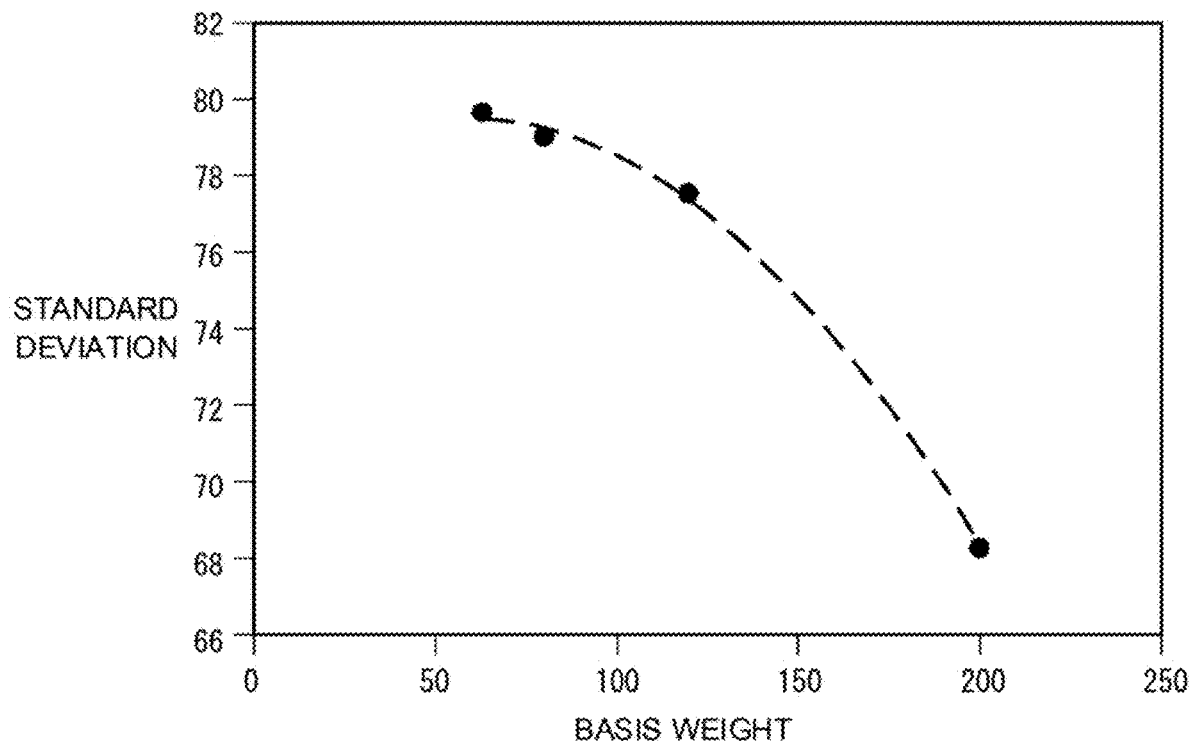
FIG. 11 is one example of a table of the data on the pixel value of each pixel included in the target area set for each calculation image for the different basis weights of the paper illustrated in FIG. 5.
FIG. 12 is one example of a graph of a relationship between a standard deviation and the basis weight based on the data on the pixel value illustrated in FIG. 11.

In the first calculation method, the basis weight of the paper corresponding to the amount of image blurring is calculated. In a third calculation method, the standard deviation or variance of the pixel values of all pixels included in the target area is calculated without data sorting described above. FIG. 11 is one example of a table of the data on the pixel value of each pixel included in the target area in each calculation image for four types of basis weights of the paper illustrated in FIG. 5. When the standard deviation of the pixel values of all pixels included in the target area is calculated for four types of basis weights of the paper, a third calculation formula based on a relationship between the standard deviation and the basis weight as illustrated in FIG.

Figure 13:
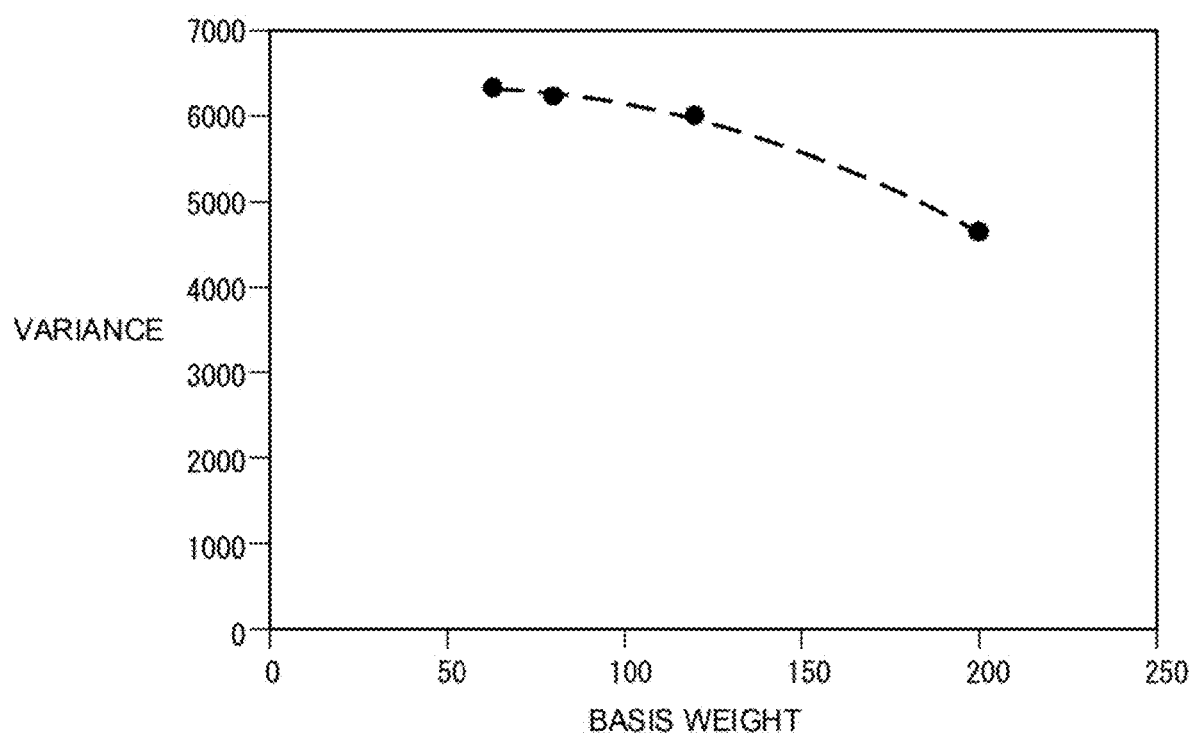
FIG. 13 is one example of a graph of a relationship between a variance and the basis weight based on the data on the pixel value illustrated in FIG. 11.

12 is derived. Moreover, when the variance of the pixel values of all pixels included in the target area is calculated for four types of basis weights of the paper, a fourth calculation formula based on a relationship between the variance and the basis weight as illustrated in FIG. 13 is derived. In the third calculation method, in the case of estimating the basis weight of certain paper, the standard deviation or variance of the pixel values of all pixels included in a target area of such paper is calculated, and the basis weight of the paper corresponding to the amount of image blurring is calculated according to the third calculation method or the fourth calculation method.

Then, in the first embodiment, printing conditions are adjusted according to the basis weight of the paper (the characteristic value of the paper). Note that the printing conditions may be adjusted according to the amount of image expansion or the amount of image blurring without conversion of the amount of image expansion or the amount of image blurring into the basis weight of the paper.

The printing conditions adjusted according to the characteristic value of the paper are the fixing temperature (the temperature of the heat roller 62) and the delivery speed of the paper when the paper passes through the fixing unit 46 (the fixing nip). That is, the amount of heat received by the paper at the fixing unit 46 is adjusted.

More specifically, adjustment is made such that the fixing temperature increases as the basis weight of the paper increases (the amount of image expansion or the amount of image blurring increases). Moreover, adjustment is made such that the delivery speed of the paper upon passage through the fixing nip decreases as the basis weight of the paper increases. Note that both of the fixing temperature and the delivery speed of the paper upon passage through the fixing nip may be adjusted, or any one of these conditions may be adjusted.

This is because the thermal absorptivity, thermal insulation, and adiabaticity of the paper increase in the case of a greater basis weight of the paper and therefore the amount of heat necessary for fixing the unfixed toner on the paper increases.

Note that in the case of a great roughness or a low uniformity (homogeneity) of the fibers forming the paper, the amount of image expansion or the amount of image blurring might increase regardless of the basis weight. In this case, the paper contains much air, and therefore, resistance of heat transfer of the paper increases. Thus, the amount of heat necessary for fixing the unfixed toner on the paper increases, and therefore, the above-described adjustment method can be directly used.

Instead of the above-described calculation method, the characteristic value of the paper may be calculated based on the contrast (the pixel value of the non-image area−the pixel value of the image area/the pixel value of the non-image area) of each pixel.

Further, in a case where the amount of difference between the pattern image and the transmission image is detectable, the printing conditions may be, instead of the above-described calculation method, adjusted according to the amount of difference between the pattern image and the transmission image. The amount of difference between the pattern image and the transmission image is, for example, the amount of difference in a diameter, a circumferential length, a shape, a sharpness, a SN ratio, or a frequency component between the pattern image and the transmission image.

Operation of the image formation apparatus 10 as described above is implemented in such a manner that the CPU 80 executes the control program stored in the RAM 84. Specific processing will be described later with reference to a flowchart.

Figure 14:
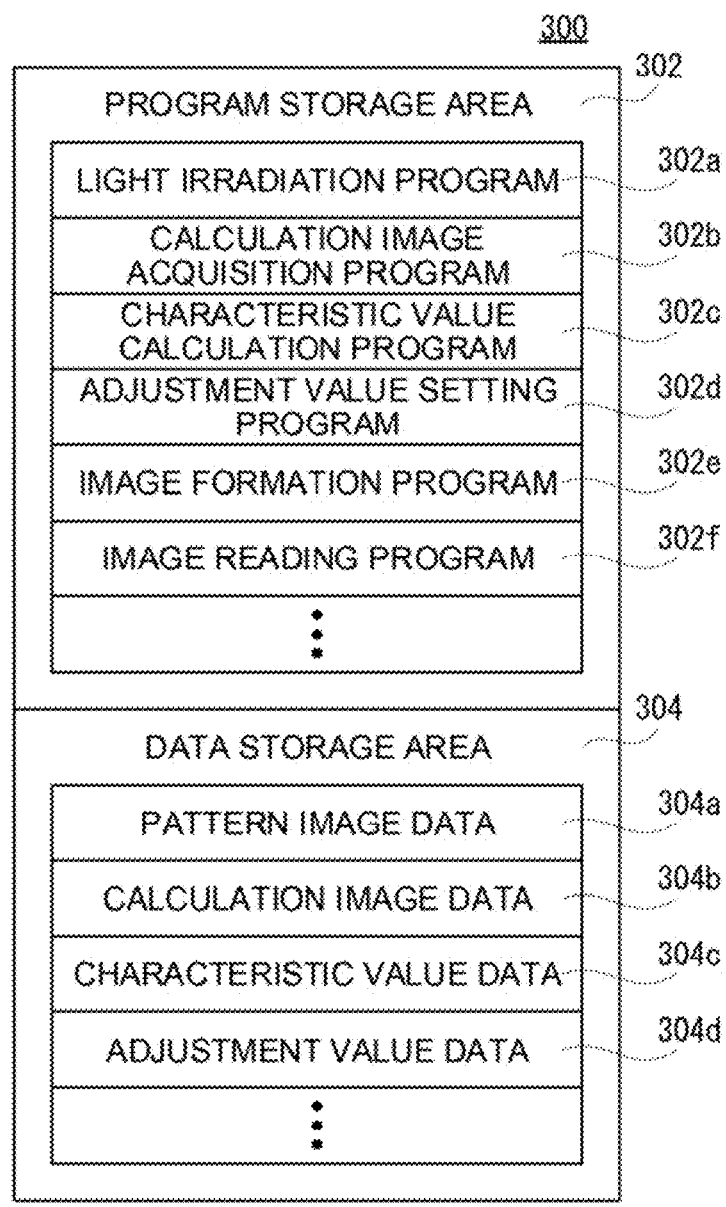
FIG. 14 is a diagram for describing one example of a memory map of a RAM illustrated in FIG. 2.

FIG. 14 is a diagram for describing one example of a memory map 300 of the RAM 84 illustrated in FIG. 2. As illustrated in FIG. 14, the RAM 84 includes a program storage area 302 and a data storage area 304. In the program storage area 302 of the RAM 84, the control program of the image formation apparatus 10 is stored as described above. The control program includes a light irradiation program 302a, a calculation image acquisition program 302b, a characteristic value calculation program 302c, an adjustment value setting program 302d, an image formation program 302e, and an image reading program 302f.

The light irradiation program 302a is a program for controlling the irradiator 880 to irradiate the paper with the predetermined pattern image while the paper is passing through the detection sensor 88.

The calculation image acquisition program 302b is a program for controlling the acquirer 882 to acquire the calculation image while the paper is passing through the detection sensor 88 (when the irradiator 880 irradiates the paper with the pattern image).

The characteristic value calculation program 302c is a program for calculating the characteristic value (the amount of image expansion or image blurring or the basis weight of the paper corresponding to such an amount) of the paper according to the calculation image acquired by the acquirer 882.

The adjustment value setting program 302d is a program for setting an adjustment value for adjusting the fixing temperature and/or the delivery speed of the paper upon passage through the fixing nip according to the characteristic value of the paper calculated according to the characteristic value calculation program 302c. That is, the adjustment value setting program 302d includes a fixing temperature adjustment program for adjusting the fixing temperature and a delivery speed adjustment program for adjusting the delivery speed.

The image formation program 302e is a program for controlling the image former 30 upon execution of a printing job to print a multi-color or single-color print image on the paper according to a print image. Note that the image formation program 302e is also a program for changing the fixing temperature from a preset temperature (a set temperature) according to the adjustment value set according to the adjustment value setting program 302d or changing the delivery speed of the paper upon passage through the fixing nip from a preset speed (a set speed).

The image reading program 302f is a program for controlling the image reader 26 to read a document image and output an image signal (the image data) corresponding to the read image.

Note that although not shown in the figure, the program storage area 302 also stores, for example, a program for detecting the position of the paper delivered in the first paper delivery path L1 and the second paper delivery path L2 according to the output of the position detection sensor and a program for selecting and executing various functions of the image formation apparatus 10.

In the data storage area 304 of the RAM 84, pattern image data 304a, calculation image data 304b, characteristic value data 304c, the adjustment value data 304d, etc. are stored.

The pattern image data 304a is data on the pattern image irradiated from the irradiator 880, and for example, is data on the diameter, circumferential length, or shape of the pattern image and data on the theoretical edge position. The calculation image data 304b is data on the calculation image acquired by the acquirer 882. The characteristic value data 304c is data indicating the characteristic value of the paper obtained from the calculation image. The adjustment value data 304d is data indicating the adjustment value for adjusting the fixing temperature and data indicating the adjustment value for adjusting the delivery speed of the paper upon passage through the fixing nip.

Note that although not shown in the figure, the data storage area 304 stores data on the set temperature of the fixing temperature and data on the set speed of the delivery speed of the paper upon passage through the fixing nip, is provided with a register necessary for execution of other control programs, and stores other types of data necessary for execution of the control program.

Figure 15:
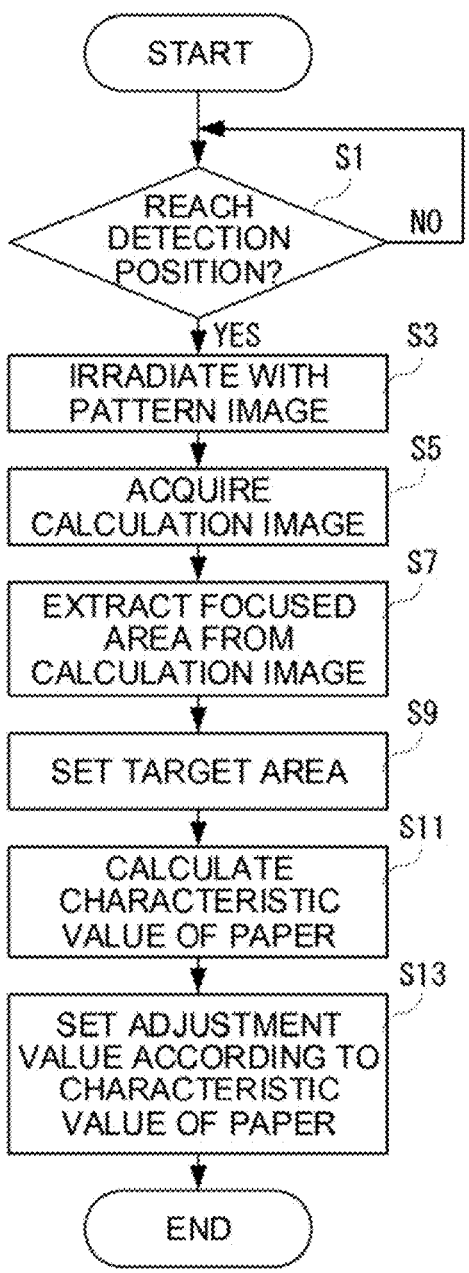
FIG. 15 is a flowchart of one example of adjustment processing of a CPU of the image formation apparatus.

FIG. 15 is a flowchart of one example of adjustment processing of the CPU of the image formation apparatus. Such adjustment processing is executed in parallel with the image formation processing of forming the image on the paper. The adjustment processing begins when the image formation processing begins. As illustrated in FIG. 15, when the adjustment processing begins, the CPU 80 determines, at a step S1, whether or not the paper has reached a detection position on the first paper delivery path L1, i.e., the position of the detection sensor 88. In the first embodiment, in a case where the tip end of the paper delivered in the first paper delivery path L1 has reached the resist roller 68, it is determined that the paper has reached the detection position.

In the case of "NO" at the step S1, i.e., in a case where the paper does not reach the detection position yet, the processing returns to the step S1. On the other hand, in the case of "YES" at the step S1, i.e., in a case where the paper has reached the detection position, the irradiator 880 irradiates the paper with the pattern image at a step S3, the acquirer 882 is driven to acquire the calculation image at a step S5, the focused area is extracted from the calculation image at a step S7, the target area including the focused area is set in the calculation image at a step S9, the characteristic value of the paper is calculated from the target area at a step S11, and the adjustment value for adjusting the fixing temperature and/or the delivery speed of the paper upon passage through the fixing nip is set according to the calculated characteristic value of the paper at a step S13. Then, the adjustment processing ends. Note that in the image formation processing, the adjustment value set in such adjustment processing is applied, and the fixing temperature and/or the delivery speed of the paper upon passage through the fixing nip are adjusted.

According to the first embodiment, the characteristic value of the paper is calculated from the calculation image including the transmission image corresponding to the pattern image, and therefore, the characteristics of the paper can be properly discriminated. Thus, the printing conditions can be properly adjusted according to the characteristics of the paper.

Moreover, according to the first embodiment, the fixing temperature is adjusted according to the characteristic value of the paper, and therefore, fixing performance can be improved such that the amount of heat necessary for fixing the unfixed toner on the paper is ensured.

Further, according to the first embodiment, the delivery speed of the paper upon passage through the fixing nip is adjusted according to the characteristic value of the paper, and therefore, the fixing performance can be improved such that the amount of heat necessary for fixing the unfixed toner on the paper is ensured.

Note that the irradiator 880 preferably has a laser oscillator, and the light irradiated from the irradiator 880 is preferably laser light. The paper delivered in the first paper delivery path L1 is, due to, e.g., uplifting, sometimes delivered at a position different from an intended position (an ideal delivery position). When such a paper delivery position shift is caused, the focal point of the pattern image irradiated from the irradiator 880 does not match a paper surface, and image blurring might be caused regardless of the basis weight of the paper. In response to such a problem, highly-directional laser light is used so that image blurring due to the paper delivery position shift can be prevented and the characteristics of the paper can be properly discriminated.

Second Embodiment

An image formation apparatus 10 of a second embodiment is the same as the image formation apparatus 10 of the first embodiment, except that the shape of a pattern image irradiated from an irradiator 880 is different. Thus, contents different from those of the first embodiment will be described, and overlapping description will be omitted.

Figure 16:
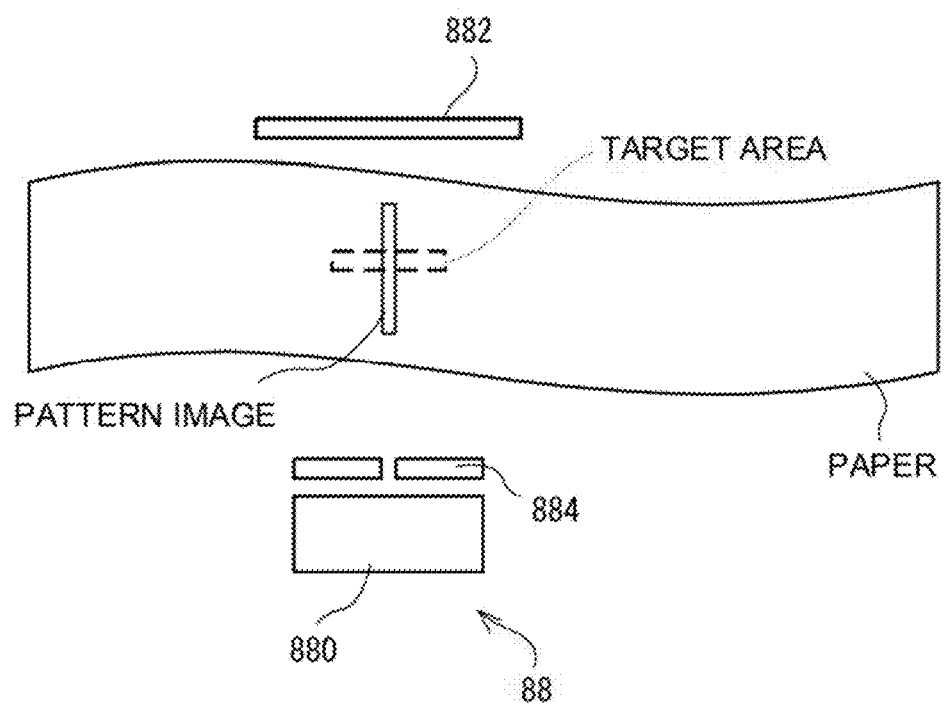
FIG. 16 is a view for describing a pattern image in a second embodiment.

FIG. 16 is a view for describing the pattern image in the second embodiment. As illustrated in FIG. 16, in the second embodiment, a shielding member 884 is provided between the irradiator 880 and a first paper delivery path L1, and a linear slit is formed at the shielding member 884. Part of light irradiated from the irradiator 880 is shielded by the shielding member 884. Of the light irradiated from the irradiator 880, only light having passed through the slit reaches paper. Thus, the paper is irradiated with the linear pattern image. That is, in a configuration illustrated in FIG. 16, the paper is irradiated with a linear high-luminance image (hereinafter sometimes referred to as a "bright line") surrounded by a low-luminance area. Note that a configuration of the shielding member 884 may be changed such that the paper is irradiated with a linear low-luminance image (hereinafter sometimes referred to as a "black line") surrounded by a high-luminance area.

As described above, when the paper is irradiated with the linear pattern image, a linear transmission image corresponding to the pattern image is formed on an acquirer-882-side surface of the paper.

Note that the slit formed at the shielding member 884 is formed inclined at a predetermined angle with respect to a paper delivery direction. The slit formed at the shielding member 884 is preferably formed perpendicularly to the paper delivery direction. Thus, the paper is irradiated with the linear pattern image inclined at the predetermined angle with respect to the paper delivery direction, and according to such a pattern image, the linear transmission image inclined at the predetermined angle with respect to the paper delivery direction is formed on the acquirer-882-side surface of the paper.

In the second embodiment, a characteristic value of the paper is calculated from a calculation image including the linear transmission image corresponding to the linear pattern image. Note that a target area is set to cross the linear transmission image, and is preferably set perpendicularly to the linear transmission image. For example, the target area is set to extend in the paper delivery direction. Note that a paper characteristic value calculation method and a printing condition adjustment method after the target area has been set are the same as those of the first embodiment, and therefore, description will be omitted.

According to the second embodiment, the target area is, using the linear pattern image, set to cross the linear transmission image. Thus, the width of the target area can be increased as compared to the case of using a dot-shaped pattern image, and fluctuation in a pixel value due to influence of paper quality can be reduced. Thus, stability and accuracy upon calculation of the characteristic value of the paper can be improved.

Note that in the second embodiment, a one-dimensional line sensor configured such that light receiving pixels are arranged on one axis can be used as the acquirer 882 instead of an image capturing sensor configured such that light receiving pixels are arranged in a two-axis direction. In the case of using the dot-shaped pattern image as in the first embodiment, the image capturing sensor configured such that the light receiving pixels are arranged in the two-axis direction needs to be used against a paper delivery position shift. On the other hand, in the case of using the linear pattern image inclined at the predetermined angle with respect to the paper delivery direction, the calculation image including the transmission image can be acquired even by the one-dimensional line sensor. Note that in the case of using the one-dimensional line sensor, the entirety of the calculation image acquired by the line sensor may be set as the target area, or part of the calculation image may be set as the target area. As described above, the one-dimensional line sensor is used as the acquirer 882 so that a configuration of the acquirer 882 can be simplified and the processing of calculating the characteristic value of the paper can be simplified.

Third Embodiment

An image formation apparatus 10 of a third embodiment is the same as the image formation apparatus 10 of the second embodiment, except that a configuration of a detection sensor 88 is different. Thus, contents different from those of the second embodiment will be described, and overlapping description will be omitted.

Figure 17:
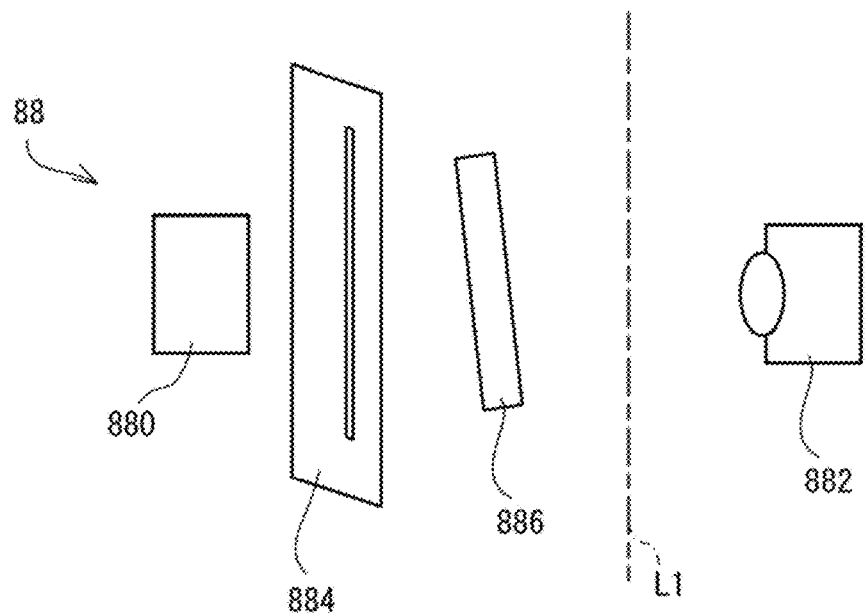
FIG. 17 is a view for describing an outline configuration of a detection sensor in a third embodiment.

FIG. 17 is a view for describing an outline configuration of the detection sensor 88 in the third embodiment. As illustrated in FIG. 17, in the third embodiment, a cylindrical lens 886 is provided between a shielding member 884 and a first paper delivery path L1. The cylindrical lens 886 is arranged such that a longitudinal direction thereof is along a longitudinal direction of a slit of the shielding member 884. That is, the cylindrical lens 886 is arranged along a linear pattern image.

Note that the cylindrical lens 886 is arranged inclined at a predetermined angle (e.g., less than 10°) with respect to paper delivered in the first paper delivery path L1.

In the third embodiment, the paper is, through the cylindrical lens 886, irradiated with light, which has passed through the slit, of light irradiated from an irradiator 880. Note that the cylindrical lens 886 is inclined at the predetermined angle with respect to the paper, and therefore, a pattern image is brought to a focus at any position on the paper. Thus, even in a case where a paper delivery position shift is caused, an area without image expansion or image blurring is present in the linear pattern image with which the paper is irradiated.

In the third embodiment, upon extraction of a focused area from a calculation image, a thinnest area of a transmission image included in the calculation image, i.e., an area of the transmission image corresponding to an area brought to a focus on the pattern image on the paper, is searched, and is extracted as the focused area. Then, a target area is set to include the focused area (the thinnest area of the transmission image). Note that a paper characteristic value calculation method and a printing condition adjustment method after the target area has been set are the same as those of the first embodiment, and therefore, description will be omitted.

According to the third embodiment, the cylindrical lens 886 inclined at the predetermined angle with respect to the paper is provided between the shielding member 884 and the first paper delivery path L1, and therefore, the pattern image is brought to a focus at any position of the linear pattern image with which the paper is irradiated. Thus, the amount of image expansion or the amount of image blurring is calculated from an area of the transmission image including the area corresponding to the area brought to a focus on the pattern image on the paper, and therefore, even in a case where the paper delivery position shift is caused, stability and accuracy upon calculation of a characteristic value of the paper can be improved.

Fourth Embodiment

An image formation apparatus 10 of a fourth embodiment is the same as the image formation apparatus 10 of the first embodiment, except that the shape of a pattern image irradiated from an irradiator 880 is different. Thus, contents different from those of the first embodiment will be described, and overlapping description will be omitted.

Figure 18:
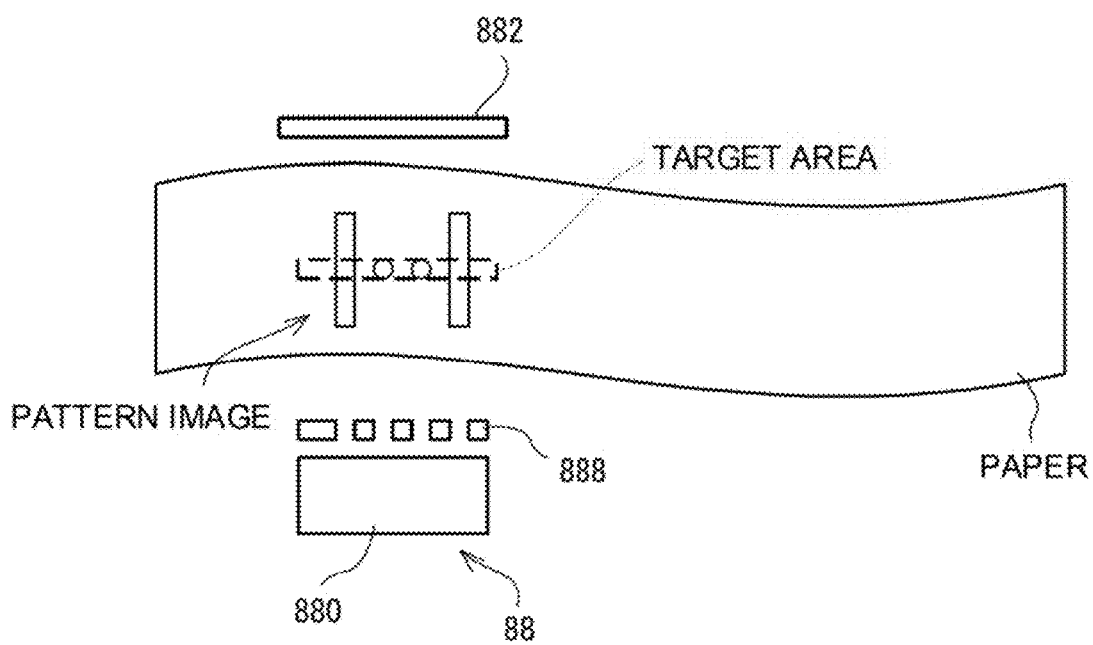
FIG. 18 is a view for describing a pattern image in a fourth embodiment.

FIG. 18 is a view for describing the pattern image in the fourth embodiment. As illustrated in FIG. 18, in the fourth embodiment, a shielding member 888 is provided between the irradiator 880 and a first paper delivery path L1, and multiple independently-arranged slits are formed at the shielding member 888.

Thus, paper is irradiated with a predetermined pattern image including multiple elements independently arranged according to the slit shape of the shielding member 888. In an example illustrated in FIG. 18, the pattern image includes multiple dots and multiple lines. Note that the shape of each element forming the pattern image is not limited to the dot and the line, and may be a curved line, a circle, or a polygon, for example. Moreover, a portion of the pattern image corresponding to the multiple elements may be a high-luminance image or a low-luminance image. When the paper is irradiated with the pattern image including these multiple elements, a transmission image corresponding to the pattern image and including multiple elements is formed on an acquirer-882-side surface of the paper. That is, the transmission image includes the multiple elements each corresponding to the multiple elements forming the pattern image.

In the fourth embodiment, a characteristic value of the paper is calculated from a calculation image including the transmission image corresponding to the pattern image. Note that a target area is set to include the multiple elements forming the transmission image. Preferably, the target area is set to include all of the multiple elements forming the transmission image. Note that a paper characteristic value calculation method and a printing condition adjustment method after the target area has been set are the same as those of the first embodiment, and therefore, description will be omitted.

According to the fourth embodiment, the pattern image including the independently-arranged multiple elements is used so that the number of edges of the image included in the target area can be increased and stability and accuracy upon calculation of the characteristic value of the paper can be improved.

Note that in the fourth embodiment, a one-dimensional line sensor can be also used as an acquirer 882 as in the second embodiment.

Fifth Embodiment

An image formation apparatus 10 of a fifth embodiment is the same as the image formation apparatus 10 of the first embodiment, except that two or more calculation images are acquired for the same paper to calculate a characteristic value of the paper. Thus, contents different from those of the first embodiment will be described, and overlapping description will be omitted.

In the fifth embodiment, an acquirer 882 acquires two or more (multiple) calculation images for the same paper. The multiple calculation images are acquired at different points of timing while the paper is passing through a detection sensor 88. Note that the number of calculation images acquired for the same paper is preset, and can be changed as necessary.

Then, when the multiple calculation images are acquired, an image (an averaged image) obtained by averaging of the multiple calculation images is generated, and the characteristic value of the paper is calculated from the averaged image. That is, a focused area is extracted from the averaged image, a target area is set in the averaged image, and the characteristic value of the paper is calculated from the target area. Note that a paper characteristic value calculation method and a printing condition adjustment method after the target area has been set are the same as those of the first embodiment, and therefore, description will be omitted.

Moreover, in the fifth embodiment, for implementing operation described above, a control program stored in a program storage area 302 of a RAM 84 of the image formation apparatus 10 includes, for example, an image processing (averaging) program for averaging the multiple calculation images. Moreover, a data storage area 304 stores data on the averaged image, and a characteristic value calculation program 302c is also a program for calculating the characteristic value of the paper from the averaged image.

Hereinafter, adjustment processing of the image formation apparatus 10 in the fifth embodiment will be described with reference to a flowchart. However, the same reference numerals are used to represent the same processing as that of the adjustment processing described in the first embodiment, and overlapping contents will not be described or will be briefly described.

Figure 19:
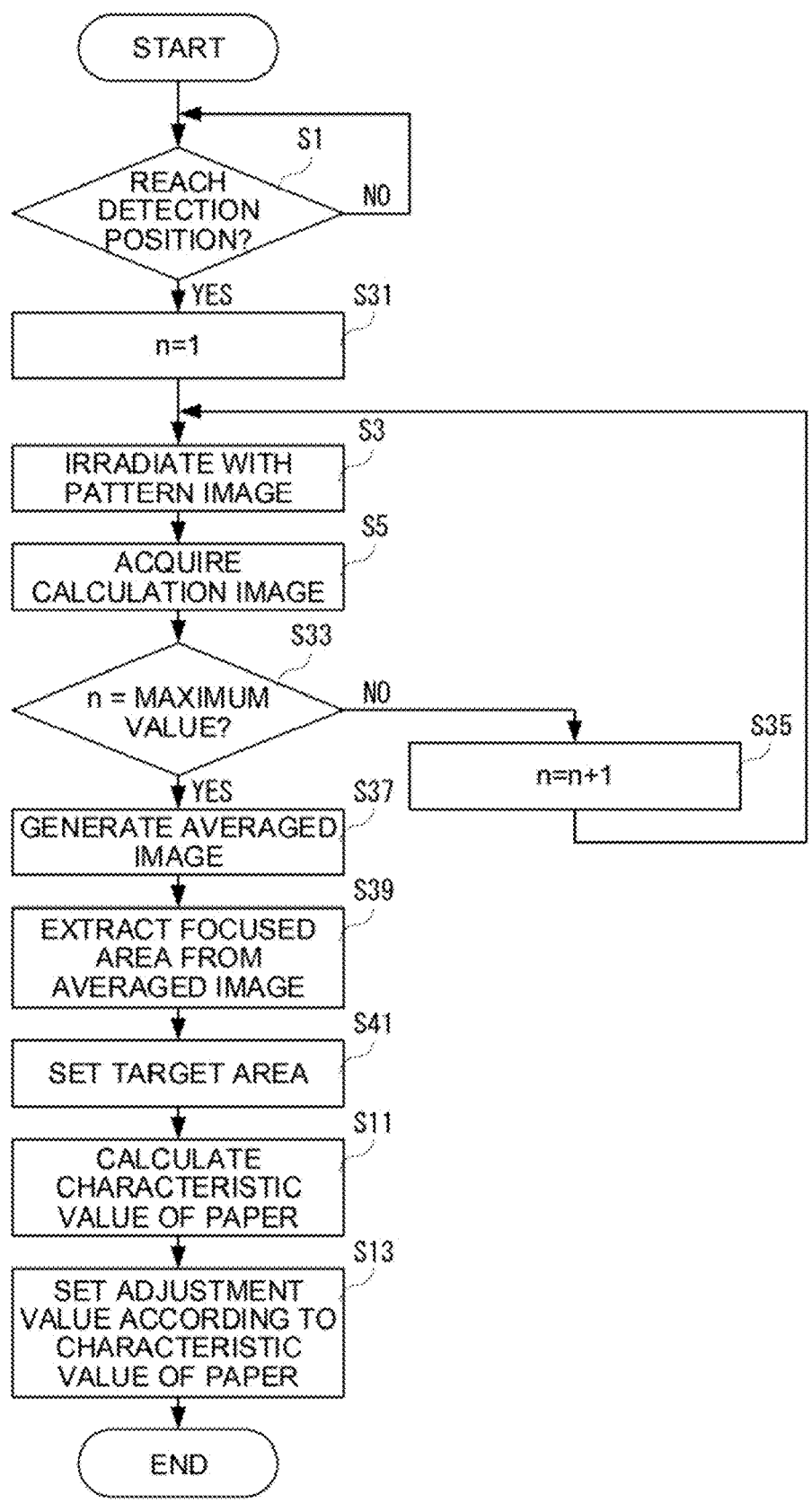
FIG. 19 is a flowchart of one example of adjustment processing in a fifth embodiment.

FIG. 19 is a flowchart of one example of the adjustment processing in the fifth embodiment. As illustrated in FIG. 19, when the adjustment processing begins, a CPU 80 sets, in the case of "YES" at a step S1, an initial value to a variable n at a step S31 (n=1), and the processing proceeds to a step S3. The variable n is a variable for counting the number of calculation images. Subsequently, the calculation images are acquired at a step S5, and at a step S33, it is determined whether or not the variable n is a maximum value, i.e., whether or not the variable n has reached the present number of calculation images acquired for the same paper. In the case of "NO" at the step S33, i.e., in a case where the variable n is not the maximum value, one is added to the variable n at a step S35 (n=n+1), and the processing returns to the step S3. On the other hand, in the case of "YES" at the step S33, i.e., when the variable n is the maximum value, the averaged image is generated at a step S37, the focused area is extracted from the averaged image at a step S39, and the target area including the focused area in the averaged image is set at a step S41. Then, the processing proceeds to a step S11.

Note that processing contents after the step S11 are the same as those of the first embodiment, and therefore, description will be omitted.

According to the fifth embodiment, the characteristic value of the paper is calculated based on the averaged image obtained by averaging of the multiple calculation images, and therefore, influence of non-uniformity of the paper due to the crude density of the paper and a void in the paper can be reduced and stability and accuracy upon calculation of the characteristic value of the paper can be improved.

Note that an aspect described in the fifth embodiment can be employed in combination with the second to fourth embodiments.

Sixth Embodiment

An image formation apparatus 10 of a sixth embodiment is the same as the image formation apparatus 10 of the first embodiment, except that reading in a detection sensor 88 is constantly performed. Thus, contents different from those of the first embodiment will be described, and overlapping description will be omitted.

In the sixth embodiment, an irradiator 880 constantly irradiates a predetermined pattern image, and an acquirer 882 constantly acquires an image. When paper passes through the detection sensor 88, an image capturing area of the acquirer 882 is shielded by the paper, and light irradiated from the irradiator 880 is shielded. On the other hand, when the paper does not pass through the detection sensor 88, the image capturing area of the acquirer 882 is not shielded, and the light irradiated from the irradiator 880 directly reaches the acquirer 882.

Thus, the amount of light of the image acquired by the acquirer 882 when the paper passes through the detection sensor 88 decreases (a light amount decrease) when a tip end of the paper has reached the position of the detection sensor 88, and increases (a light amount increase) after a back end of the paper has passed through the position of the detection sensor 88. That is, the paper is present at the position of the detection sensor 88 until the light amount increase occurs after occurrence of the light amount decrease.

Thus, in the sixth embodiment, the image acquired by the acquirer 882 until the light amount increase after the light amount decrease is a calculation image. Note that the calculation image acquired by the acquirer 882 until the light amount increase after the light amount decrease may be a video or multiple still images acquired at predetermined timing. Note that the image acquired by the acquirer 882 until the light amount decrease and the image acquired by the acquirer 882 after the light amount increase are mainly used for determination on the light amount, and therefore, can be taken as images for light amount determination.

When the calculation image is acquired, an averaged image obtained by averaging of multiple calculation images is generated, and a characteristic value of the paper is calculated from the averaged image. Note that the method for setting a target area from the averaged image is the same as that of the fifth embodiment, and therefore, description will be omitted. Moreover, a paper characteristic value calculation method and a printing condition adjustment method after the target area has been set are the same as those of the first embodiment, and therefore, description will be omitted.

Moreover, in the sixth embodiment, for implementing operation described above, a control program stored in a program storage area 302 of a RAM 84 of the image formation apparatus 10 includes, for example, a light amount detection program for detecting the amount of light of the image acquired by the acquirer 882 and a light amount determination program for determining whether or not the amount of light of the image (including the light amount determination image and the calculation image) acquired by the acquirer 882 is greater (less) than a predetermined light amount. Moreover, a data storage area 304 stores data on the averaged image, and a characteristic value calculation program 302c is also a program for calculating the characteristic value of the paper from the averaged image.

Hereinafter, adjustment processing of the image formation apparatus 10 in the sixth embodiment will be described with reference to a flowchart. However, the same reference numerals are used to represent the same processing as that of the adjustment processing described in the first embodiment, and overlapping contents will not be described or will be briefly described.

Figure 20:
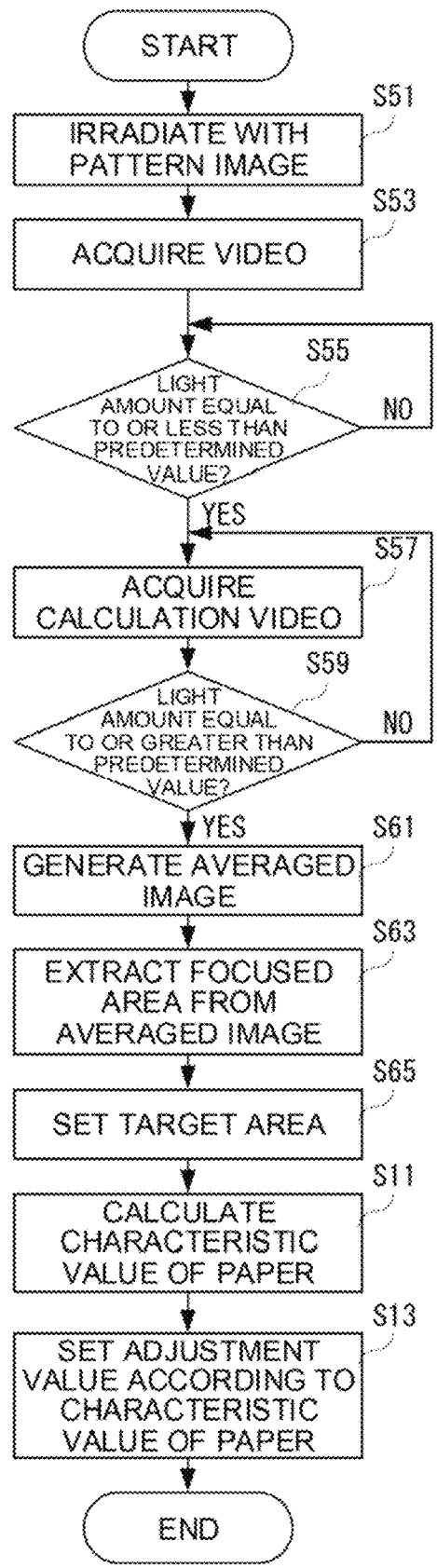
FIG. 20 is a flowchart of one example of adjustment processing in a sixth embodiment.

FIG. 20 is a flowchart of one example of the adjustment processing in the sixth embodiment. As illustrated in FIG. 20, when the adjustment processing begins, a CPU 80 causes the irradiator 880 to irradiate the paper with the pattern image at a step S51, drives the acquirer 882 to acquire the light amount determination image at a step S53, and determines, at a step S55, whether or not the amount of light of the light amount determination image is less than the predetermined light amount, i.e., whether or not there is the light amount decrease.

In the case of "NO" at the step S55, i.e., in the case of determining that there is no light amount decrease, the processing returns to the same step S55. On the other hand, in the case of "YES" at the step S55, i.e., in the case of determining that there is the light amount decrease, the calculation image is acquired at a step S57, and at a step S59, it is determined whether or not the amount of light of the calculation image is greater than the predetermined light amount, i.e., whether or not there is the light amount increase.

In the case of "NO" at the step S59, i.e., in the case of determining that there is no light amount increase, the processing returns to the step S57. On the other hand, in the case of "YES" at the step S59, i.e., the case of determining that there is the light amount increase, the averaged image is generated at a step S61, a focused area is extracted from the averaged image at a step S63, and the target area including the focused area in the averaged image is set at a step S65. Then, the processing proceeds to a step S11.

Note that processing contents after the step S11 are the same as those of the first embodiment, and therefore, description will be omitted.

According to the sixth embodiment, the characteristic value of the paper is calculated based on the averaged image obtained by averaging of the calculation images acquired until the light amount increase after the light amount decrease, and therefore, influence of non-uniformity of the paper due to the crude density of the paper and a void in the paper can be reduced and stability and accuracy upon calculation of the characteristic value of the paper can be improved.

Note that an aspect described in the sixth embodiment can be employed in combination with the second to fifth embodiments.

Moreover, specific numerical values, configurations, etc. described in the above-described embodiments are one example, and can be changed as necessary according to an actual product.

DESCRIPTION OF REFERENCE NUMERALS 10 image formation apparatus
26 image reader
30 image former
36 photoconductive drum
46 fixing unit
88 detection sensor
880 irradiator
882 acquirer
L1 first paper delivery path

What is claimed is:

1. An image formation apparatus comprising:
an image former that forms an image on a recording medium delivered in a predetermined delivery path;
a light irradiator that irradiates the recording medium delivered in the predetermined delivery path with a predetermined pattern image;
an acquirer that is provided at a position facing the light irradiator through the predetermined delivery path and acquires a calculation image including a transmission image formed after the predetermined pattern image has been transmitted through the recording medium;
a calculator that extracts a luminance area corresponding to the predetermined pattern image from the calculation image as a focused image, and calculates, based on pixel values of pixels included in a linear target area that is set to extend across at least one edge of a focused area, a characteristic value of the recording medium as an amount of expansion or blurring of the transmission image for the predetermined pattern image; and
an adjustor that adjusts an image formation condition in the image former according to the characteristic value calculated by the calculator.

2. The image formation apparatus according to claim 1, wherein the image former includes:
a transferor that transfers a toner image to the recording medium; and
a fixer that heats and fixes the toner image on the recording medium, wherein
the adjustor adjusts an amount of heat received by the recording medium at the fixer.

3. The image formation apparatus according to claim 2, wherein the adjustor adjusts a fixing temperature at the fixer according to the characteristic value.

4. The image formation apparatus according to claim 2, wherein the adjustor adjusts, according to the characteristic value, a delivery speed of the recording medium while the recording medium is passing through the fixer.

5. The image formation apparatus according to claim 3, wherein the adjustor adjusts, according to the characteristic value, a delivery speed of the recording medium while the recording medium is passing through the fixer.

6. The image formation apparatus according to claim 1, wherein the predetermined pattern image is a dot-shaped image.

7. The image formation apparatus according to claim 1, wherein the predetermined pattern image is a linear image.

8. The image formation apparatus according to claim 1, wherein the predetermined pattern image is an image in a predetermined shape having a linear boundary.

9. The image formation apparatus according to claim 1, further comprising:
a cylindrical lens provided closer to a light irradiator side than the predetermined delivery path is to between the light irradiator and the acquirer and arranged inclined at a predetermined angle with respect to the recording medium delivered in the predetermined delivery path.

10. The image formation apparatus according to claim 1, wherein the calculation image includes one or more still images.

11. The image formation apparatus according to claim 10, wherein
the calculation image includes multiple still images, and
the calculator calculates the characteristic value based on an image obtained by averaging of the multiple still images.

12. A non-transitory computer-readable recording medium storing a control program in an image formation apparatus including an image former that forms an image on a recording medium delivered in a predetermined delivery path, wherein the control program causes a processor of the image formation apparatus to execute:
light irradiating of irradiating the recording medium delivered in the predetermined delivery path with a predetermined pattern image;
acquiring a calculation image including a transmission image formed after the predetermined pattern image has been transmitted through the recording medium;
extracting a luminance area corresponding to the predetermined pattern image from the calculation image as a focused image, and calculating, based on pixel values of pixels included in a linear target area that is set to extend across at least one edge of a focused area, a characteristic value of the recording medium as an amount of expansion or blurring of the transmission image for the predetermined pattern image; and
adjusting an image formation condition in the image former according to the characteristic value.

13. A method for controlling an image formation apparatus including an image former that forms an image on a recording medium delivered in a predetermined delivery path, comprising:
(a) irradiating the recording medium delivered in the predetermined delivery path with a predetermined pattern image;
(b) acquiring a calculation image including a transmission image formed after the predetermined pattern image has been transmitted through the recording medium;
(c) extracting a luminance area corresponding to the predetermined pattern image from the calculation image as a focused image, and calculating, based on pixel values of pixels included in a linear target area that is set to extend across at least one edge of a focused area, a characteristic value of the recording medium as an amount of expansion or blurring of the transmission image for the predetermined pattern image; and
(d) adjusting, an image formation condition in the image former according to the characteristic value.

* * * * *